United States Patent [19]

Janse et al.

[11] Patent Number: 5,404,397
[45] Date of Patent: Apr. 4, 1995

[54] CONFERENCE SYSTEM WITH AUTOMATIC SPEAKER DETECTION AND SPEAKER UNIT

[75] Inventors: Cornelis P. Janse, Eindhoven; Johannes M. Meijer, Breda, both of Netherlands

[73] Assignee: U.S. Phillips Corporation, New York, N.Y.

[21] Appl. No.: 41,802

[22] Filed: Apr. 1, 1993

[30] Foreign Application Priority Data

Apr. 16, 1992 [EP] European Pat. Off. ........... 92201095

[51] Int. Cl.6 ............................................. H04M 1/20
[52] U.S. Cl. .................................... 379/206; 379/202; 379/406; 379/410; 379/411; 370/62; 370/32.1; 381/111; 381/95; 381/96; 364/724.10
[58] Field of Search ................ 379/202, 203, 204, 205, 379/206, 207, 410, 411, 406, 387, 59, 339; 381/119, 111, 110, 121, 95, 96; 370/62, 32.1; 364/724.10

[56] References Cited

U.S. PATENT DOCUMENTS

| | | | |
|---|---|---|---|
| 4,302,631 | 11/1981 | Shenoi et al. | 379/339 |
| 4,604,501 | 8/1986 | Richmond et al. | 381/110 |
| 4,658,425 | 4/1987 | Julstrom | 379/206 |
| 4,862,449 | 8/1989 | Hoefkens et al. | 379/411 |
| 5,062,102 | 10/1991 | Taguchi | 379/410 |
| 5,271,057 | 12/1993 | Addeo et al. | 379/202 |

FOREIGN PATENT DOCUMENTS 0191492  4/1990  European Pat. Off. .
0471083  2/1992  European Pat. Off. .

OTHER PUBLICATIONS

W. Armbruster, "High Quality Hands-Free Telephony Using Voice Switching Optimised with Echo Cancellation", Signal Processing IV: Theories and Applications, 1988, pp. 495–498.

Primary Examiner—James L. Dwyer
Assistant Examiner—Scott Wolinsky
Attorney, Agent, or Firm—Norman N. Spain

[57] ABSTRACT

A conference system comprises speaker units (12) coupled to a central unit (14). The speaker unit (12) comprises an echo canceller (20) with an adaptive filter (38) having an impulse response of comparatively short duration. In a speech pause of the user of the speaker unit (12) the common listening signal (LS) of the conference system is applied to the loudspeaker (18). Of the sounds then picked up by the microphone (16) only those sounds are compensated which are produced by the loudspeaker (18) and which reach the microphone (16) directly and which reach the microphone (16) indirectly via reflections from nearby objects. These sounds have a comparatively short impulse response time and enable a comparatively simple adaptive filter (38) to be used. The other sounds picked up by the microphone (16) reach the microphone (16) via reflections from the walls of the conference space (10) in which the conference system is situated. The other sounds have a comparatively long impulse response time. For the purpose of automatic speech detection these other sounds do not require echo cancellation because they are the same for all the speaker units. Automatic speech detection is now accomplished if the signal strength of the compensated microphone signal (MCCS) produced by the echo canceller (20) exceeds the average signal level of the speaker units.

22 Claims, 5 Drawing Sheets

CONFERENCE SYSTEM WITH AUTOMATIC SPEAKER DETECTION AND SPEAKER UNIT

BACKGROUND OF THE INVENTION

The invention relates to a conference system comprising: a plurality of speaker units to be arranged in one conference space, a central unit coupled to the speaker units, at least one of the speaker units comprising:
- a microphone for generating a microphone signal,
- a speech signal output for supplying a speech signal to the central unit in response to the microphone signal,
- a listening signal input for receiving a common listening signal from the central unit, and
- a loudspeaker for the acoustic reproduction of the common listening signal.

Such a system is known from European Patent Specification EP 0,191,492. Such a conference system, also referred to as a congress system, meeting system or discussion system, serves to improve the intelligibility of speech of the participants in a meeting held in one space, for example a room or a hall. For this purpose, the participants are seated near the speaker units and speak into the microphone of the speaker unit. The microphone signal is available at the speech signal output of the speaker unit. The speaker units are coupled to the central unit in which the speech signals from the speaker units can be selected and added to form the common listening signal, which is transferred to the loudspeakers of the speaker units. In order obtain a maximal system gain, only the speech signals from those participants who are speaking are selected and added and, moreover, the transfer of the common listening signal to the loudspeakers of the relevant speaker units is interrupted to preclude acoustic feedback. In the prior-art conference system, selection is based on indication signals produced by means of push-buttons on the speaker units. Since the participants often forget to actuate the push-button there is a need for an automatic speaker detection system.

In the central unit, it is possible to compare the signal levels of all the speech signals with the average speech signal level. A speaker is then detected in that the level of his speech signal is higher than the average level. As a result of the direct acoustic coupling between the loudspeaker and the microphone of the non-speaking speaker units this average level is comparatively high. Owing to this high average level as well as the required margin the speaker signal should be fairly large to exceed the average level. As a result of this, in particular the beginnings of sentences and words are lost.

Another speaker-detection possibility is known from loudspeaking telephony. The speaker units are then located in different spaces. Such telephone conferencing systems also require speaker detection to control the so-called voice switch, necessary to prevent acoustic feedback. This is accomplished by the use of an echo canceller, which comprises a filter in which the listening signal is converted into a signal which is an estimate of the microphone signal. The microphone signal and the estimated signal are subtracted from one another. Speech is then detected when the actual microphone signal deviates from the estimated signal as a result of the contribution of the speaker's voice to the microphone signal. The filter is often an adaptive filter having an impulse response corresponding to the acoustic impulse response of the space in which the speaker unit is situated. This acoustic impulse response is unknown a priori and may change. It requires a very complex adaptive filter having a long impulse response to allow a correct operation under all possible operating conditions. In this respect reference is made to: W. Armbrüster, "High Quality Hands-Free Telephony using Voice Switching Optimised with Echo Cancellation", Signal Processing IV: Theories and Applications, Elsevier, EURASIP, 1988. However, the use of the known echo cancellers for the purpose of speaker detection in a conference system has the drawback that the complex adaptive filters are expensive, inter alia because they require a comparatively large chip area in the case of integration. in a chip

SUMMARY OF THE INVENTION

It is an object of the invention to provide a comparatively cheap conference system with automatic speaker detection.

According to the invention a conference system of the type defined in the opening paragraph is therefor characterized in that the speaker unit further comprises an echo canceller comprising:
- a differential stage having a first input for receiving the microphone signal and a second input for receiving a compensation signal, and having an output coupled to the speech signal output to supply a compensated microphone signal in response to the difference between the microphone signal and the compensation signal, and
- an adaptive filter having a signal input for receiving the common listening signal, having a control input for receiving the compensated microphone signal, and having a signal output for supplying the compensation signal, the adaptive filter having an impulse response which is an estimate of the impulse response of a short echo path as a result of a direct acoustic coupling between the loudspeaker and the microphone of the relevant speaker unit and of an indirect acoustic coupling between the loudspeaker and the microphone of the relevant speaker unit via objects in the proximity of the speaker unit, in which estimate the impulse response of a long echo path as a result of an acoustic coupling between all the loudspeakers of all the speaker units and the microphone of the relevant speaker unit via the bounding surfaces of the conference space is ignored.

The sound picked up by the microphone of the speaker unit comprises, on the one hand, the nearby sound formed by the sounds from the loudspeaker of the respective unit reaching the microphone via direct acoustic coupling or via indirect acoustic coupling as a result of reflections from nearby objects and, on the other hand, the background sound formed by the sounds from all the loudspeakers reflected from the walls of the conference space. The invention is based on the recognition of the fact that for automatic speaker detection with a plurality of speaker units situated in one space it is adequate to provide echo cancellation only for the nearby sound reaching the microphone. The background sound, in contradistinction to that in telephone conferencing systems, is the same for all the speaker units and speaker identification is now possible by determining whether the level of the speech signal from the relevant speaker unit exceeds the background level. In this case the adaptive filter in the echo canceller does not require a long impulse response having a duration of approximately one third of the reverberation time of the conference space. An impulse response of substantially shorter duration is now adequate. This considerably simplifies the design of the adaptive filter. The filter not only becomes smaller but also provides faster adaptation.

A further embodiment of a conference system in accordance with the invention is characterized in that the speaker unit further comprises:

a status signal input for receiving from the central unit a status signal for signalling a speech status or a listening status to the speaker unit, and first coupling means for coupling the speech signal output to the microphone signal when the status signal indicates the speech status and to the compensated microphone signal when the status signal indicates the listening status.

Once the speaker has been identified the relevant speaker unit switches from the compensated microphone signal to the direct microphone signal. The last-mentioned signal is of a better quality and is not influenced by the adaptive filter. The first coupling means also have the advantage that they enable the echo canceller to be simplified even further.

To this end a further embodiment of a conference system is characterized in that the echo canceller is adapted to process signals having a bandwidth smaller than the bandwidth of the microphone signal and the common listening signal. The speaker signal can then have a large bandwidth of, for example 15 kHz, in order to provide a very good intelligibility, whilst the echo canceller operates with a small signal bandwidth of, for example, only 3.5 kHz. This small bandwidth is adequate for speaker detection because the speech energy is concentrated in this band. A further embodiment is characterized in that the conference system is constructed to provide digital signal processing with a first sampling rate for the speech signal and the common listening signal, the speaker unit comprising an analog-to-digital converter for converting an analog microphone signal into the microphone signal with the first sampling rate and a digital-to-analog converter for converting the common listening signal into an analog common listening signal, and the speaker unit further comprises:

a first decimator for reducing the first sampling rate of the microphone signal to a second sampling rate which is a predetermined decimation factor lower than the first sampling rate, and for supplying a decimated microphone signal to the first input of the differential stage, a second decimator for reducing the first sampling rate of the common listening signal to the second sampling rate and for supplying a decimated common listening signal to the signal input of the adaptive filter, an interpolator for increasing the second sampling rate of the compensated microphone signal at the output of the differential stage and for supplying the compensated microphone signal with the first sampling rate.

Another embodiment of a conference system in accordance with the invention is characterized in that the speaker unit further comprises means for interrupting the signal supply to the first input of the differential stage when the status signal indicates the speech status. This prevents the adaptive filter from being deranged by the strong microphone signal from the speaker.

Yet another embodiment of a conference system in accordance with the invention is characterized in that the speaker unit further comprises:

a comparator for comparing a power value of the microphone signal with a power value of the compensated microphone signal and for supplying a switching signal if the power value of the compensated microphone signal exceeds the power value of the microphone signal, second coupling means for replacing the compensated microphone signal by the microphone signal in response to the switching signal.

It may occur that a speaker begins to speak while his speaker signal has not (yet) been selected in the central unit, for example because the maximum number of simultaneously selected speaker signals has been reached. The strong microphone signal may then disturb the adjustment of the adaptive filter to such an extent that the compensated microphone signal becomes larger than the direct microphone signal. The comparator and the second coupling means prevent this undesired situation in that the compensated microphone signal is replaced by the direct microphone signal until the adaptive filter has been readjusted to a satisfactory extent.

The invention also relates to a speaker unit for use in the conference system.

BRIEF DESCRIPTION OF THE DRAWINGS

These and other aspects of the invention will now be described and elucidated with reference to the accompanying drawings, in which.

In these Figures, like parts bear the same reference numerals.

DESCRIPTION OF THE PREFERRED EMBODIMENTS

Figure 1:
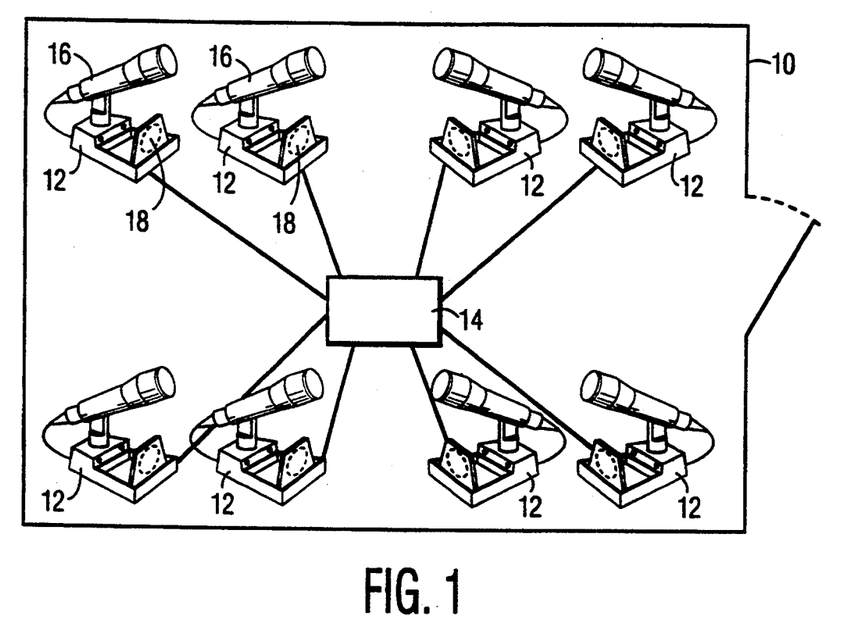
FIG. 1 shows a conference system comprising speaker units and a central unit.

FIG. 1 shows diagrammatically a conference system. A plurality of speaker units 12 are arranged in a conference space 10 and are coupled to a central unit 14, which may be situated at any location inside or outside the conference space 10. The coupling between the speaker units 12 and the central unit 14 is shown in greatly simplified form. Each participant in the conference has a speaker unit 12 at his disposal, which unit comprises a microphone 16 and a loudspeaker 18. The conference system provides automatic speaker detection. As soon as a participant starts to speak his voice will be amplified via the loudspeakers 18 of the speaker units 12 of the other participants.

Figure 2:
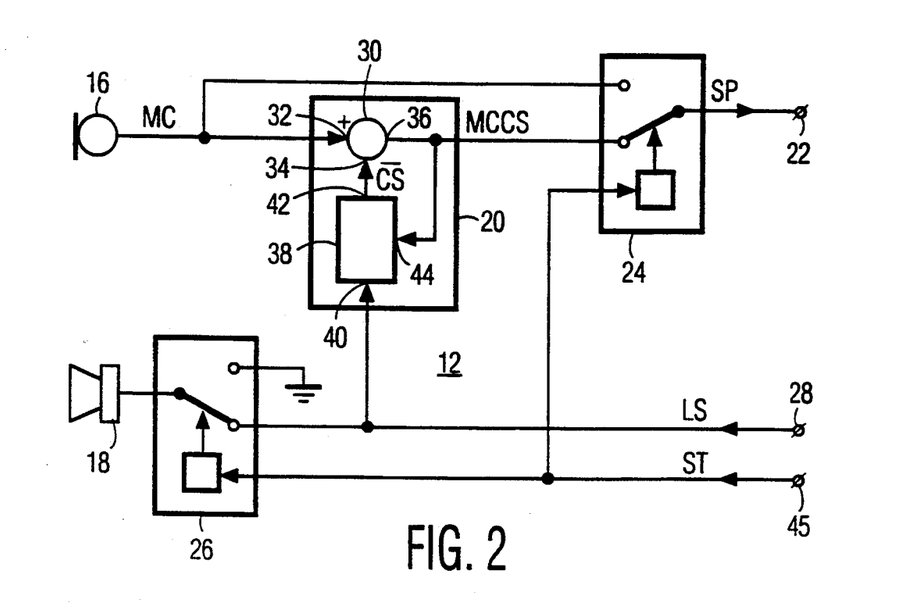
FIG. 2 shows a speaker unit for use in a conference system in accordance with the invention.

FIG. 2 is a block diagram showing an embodiment of a speaker unit 12 in accordance with the invention. The microphone 16 produces a microphone signal MC, which is applied to an echo canceller 20 supplying a compensated microphone signal MCCS. A speech-signal output 22 supplies a speech signal SP to the central unit 14, which speech signal is formed by either the microphone signal MC or the compensated microphone signal MCCS. The choice between the two signals is effected by first coupling means 24. The loudspeaker is coupled, via a circuit breaker 26, to a listening signal input 28 for receiving a common listening signal LS supplied by the central unit 14. The echo canceller 20 comprises a differential stage 30 having a first input 32 to which the microphone signal MC is applied, a second input 34 to which a compensation signal CS is applied, and an output 36 which supplies the compensated microphone signal MCCS. The echo canceller 20 further comprises an adaptive filter 38 having a signal input 40 connected to the listening signal input 28 to receive the common listening signal LS, a signal output 42 for supplying the compensation signal CS to the second input 34 of the differential stage 30, and a control input 44 connected to the output 36 of the differential stage 30 to receive the compensated microphone signal MCCS. The speaker unit 12 further comprises a status signal input 45 for receiving a status signal ST from the central unit 14. The status signal ST sets the speaker unit 12 to the speech status or to the listening status and for this purpose it activates the first coupling means 24 and the circuit breaker 26. In the speech status the circuit breaker 26 interrupts the supply of the common listening signal LS to the loudspeaker 18 in order to prevent acoustic feedback between the loudspeaker 18 and the microphone 16. In the listening status the first coupling means 24 connect the speech signal output 22 to the output 36 of the differential stage 30, so that the speech signal SP is then formed by the compensated microphone signal MCCS, and in the speech status they connect this speech signal output to the microphone 16, so that the speech signal SP is then formed by the microphone signal MC. The first coupling means (24) are optional. It is also possible to provide a direct connection between the output 36 and the speech signal output 22. However, the first coupling means 24 have advantages to be mentioned hereinafter.

Figure 3:
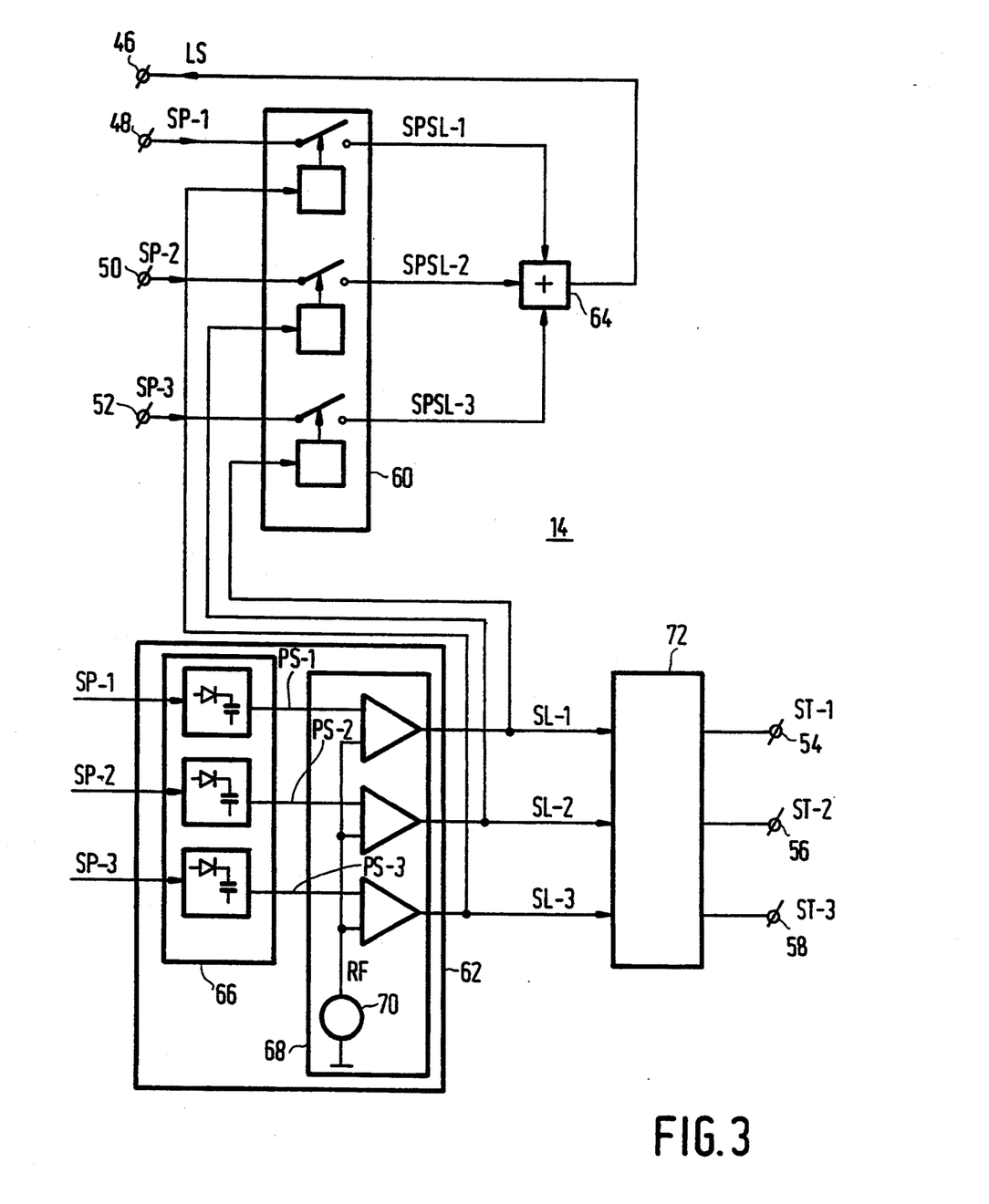
FIG. 3 shows a central unit for use in a conference system in accordance with the invention.

FIG. 3 is a block diagram showing a central unit 14 for use in the conference system in accordance with the invention. By way of example provisions for three speaker units are shown. It will be evident that another number of speaker units may be used. There have been provided an output 46 for supplying the common listening signal LS to the connected speaker units, inputs 48, 50 and 52 for receiving respective speech signals SP-1, SP-2 and SP-3 from the connected speaker units, and outputs 54, 56 and 58 for supplying respective status signals ST-1, ST-2 and ST-3 to the connected speaker units. The selection means 60 make a selection from the speech signals SP-1, SP-2 and SP-3 in response to associated selection signals SL-1, SL-2 and SL-3, which are supplied by a selection generator 62. The selected speech signals SPSL-1, SPSL-2 and SPSL-3 are added in adding means 64 to form the common listening signal LS. The selection signal generator 62 comprises a level signal generator 66, in which the signal strength of the speech signals SP-1, SP-2 and SP-3 is measured and converted into respective level signals PS-1, PS-2 and PS-3 which are measures of the signal strengths. The selection signal generator 62 further comprises comparison means 68 in which comparators compare the level signals PS-1, PS-2 and PS-3 with a reference signal RF from a reference signal source 70. Preferably, the reference signal RF is proportional to the average of the instantaneous signal strengths of all the speech signals. When one or more level signals exceeds the reference signal RF the selection signal generator 62 activates the associated selection signal SL-1, SL-2 or SL-3. The selection means then select the relevant speech signal SP-1, SP-2 or SP-3 and transfer it to the adding means 64. The selection signals SL-1, SL-2 and SL-3 are also applied to a status signal generator 72, which generates the status signal ST-1, ST-2 and ST-3 for each connected speaker unit. A value corresponding to the speech status is assigned to the status signal of the speaker units whose speech signal has been selected, a value corresponding to the listening status being assigned to the other status signals. As an alternative, the level signals PS-1, PS-2 and PS-3 may be generated locally in the speaker units, from which they are applied to the central unit.

Figure 4:
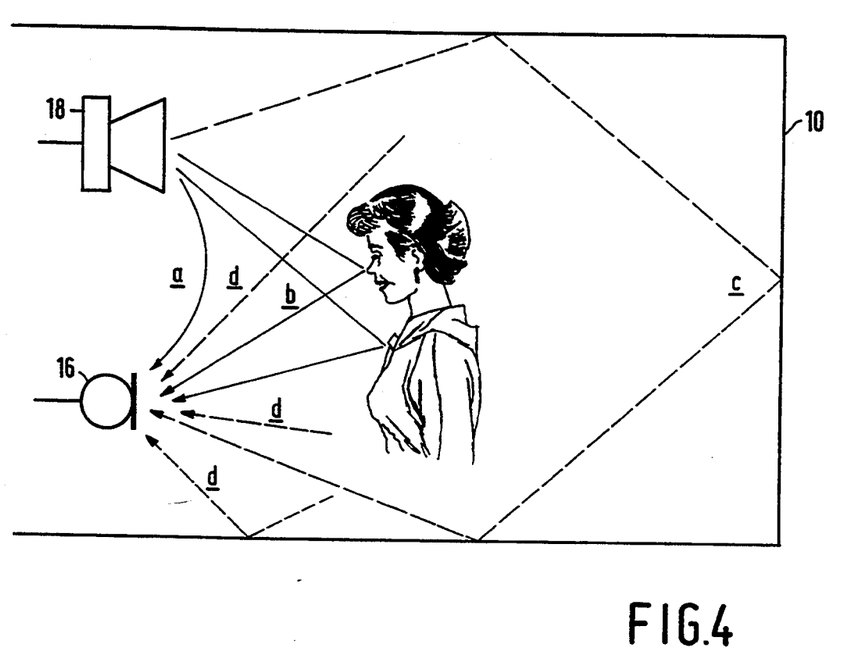
FIG. 4 shows a diagram to explain the invention.
Figure 5:
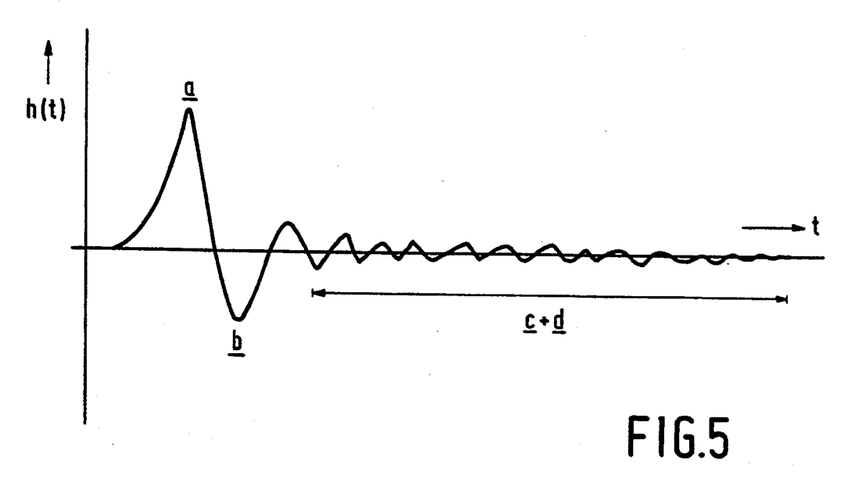
FIG. 5 shows an impulse response to explain the invention.

In the central unit 14 the signal strength of the incoming speech signals is thus compared with a reference signal RF, whose value is a measure of the average signal level of all the speech signals together. The voice of a speaker should produce a signal level above this average signal level in order to enable automatic speaker detection in the central unit. As long as a speaker is silent the microphone 16 of his speaker unit 12 picks up all kinds of sounds. This is illustrated in FIG. 4. These sounds include in the first place the sound a from the loudspeaker 18, which reaches the microphone 16 directly, in the second place the sound b from the loudspeaker 18, which reaches the microphone via reflections from the speaker and from objects in the direct proximity of the speaker unit 12, in the third place the sound c from the loudspeaker 18, which reaches the microphone 16 via reflections from the walls of the conference space 10, and in the fourth place the sound d from the other loudspeakers, which reaches the microphone 16 via reflections from the walls. The sounds a and b follow a short echo path and form a brief echo signal having a comparatively short impulse response time h(t). The sounds c and d follow a long echo path and form a long echo signal with a comparatively long impulse response time h(t). The overall impulse response is shown in FIG. 5. The echo canceller 20 in the speaker unit 12 serves to minimize the contribution of said sounds a to d to the microphone signal MC generated by the microphone 16. The average value of the microphone signal MC will then be small, so that the speaker hardly needs to raise his voice in order to be detected. The, cancellation or compensation effect is obtained by means of the adaptive filter 38, which gives an estimate of the microphone signal MC produced by the microphone 16 when the speaker is silent. The loudspeaker 18 then reproduces the common listening signal LS. The adaptive falter 38 generates a compensation signal CS, which is compared with the microphone signal MC. The difference MCCS is fed back to the control input 44 of the adaptive falter 38, which adapts falter coefficients until the difference MCCS is minimal.

Figure 6:
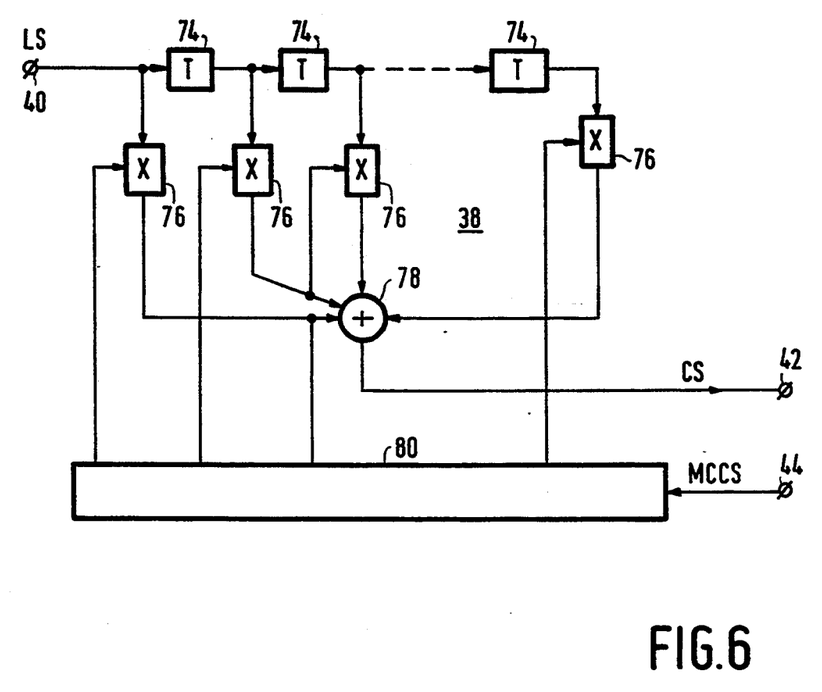
FIG. 6 is a block diagram showing an adaptive transversal filter for use in a speaker unit of a conference system in accordance with the invention.

FIG. 6 shows the block diagram of the adaptive filter 38. The filter is of the frequently used transversal type. In practice it will generally be a digital falter and in some cases this may require prior analog to digital conversion and vice versa. These conversions are not shown in FIG. 6. The adaptive falter 38 comprises a series arrangement of delay elements 74 for delaying the common listening signal LS and having tappings for supplying delayed output signals, which are applied to an adding stage 78, which supplies the compensation signal CS, via variable weighting amplifiers 76. The compensated microphone signal MCCS is applied to the control input 44 of a control unit 80, which calculates and corrects the settings of the weighting amplifiers 76 by means of a specific algorithm. The impulse response time of a falter of this type is at the most equal to the sum of the delay times of the individual delay elements 74. Total echo cancellation would require an adaptive filter 38 having an impulse response h(t) of a duration equal to approximately one third of the reverberation time $T_{60}$ (which is the time in which the level of the sound decreases by 60 dB) of the conference space 10. In practice, this time is approximately 0.2 to 0.5 seconds, the sounds c and d being involved. The impulse response h(t) of the adaptive filter would then have a duration of (0.2)/3 to (0.5)/3 seconds. At a sampling rate $f_s$ of 32 kHz this would mean a number of N=(6400)/3 to (16000)/3 delay elements 74. Such a transversal falter is bulky and complex and its adaptability is comparatively slow owing to the large number of iterations to be performed in the control unit 80 in order to estimate each of the N coefficients. In this respect reference is made to the literature and in particular to the book "Adaptive Signal Processing", Bernard Widrow & Samuel D. Stearns, Prentice Hall Signal Processing Series, ISBN 0-13-004029 01.

In accordance with the invention the speaker unit 12 comprises an echo canceller 20 for the purpose of speaker detection, which echo canceller has an adaptive filter 38 having an impulse response of only comparatively short duration, which is adequate only to compensate for the sounds a and b. Experiments have shown that in this case a duration of approximately 23 to 32 milliseconds is adequate. This means that the number of delay elements can be reduced by a factor of 3 to 5(N=720 to 1024 elements), which yields a substantial saving in hardware and, in addition, a less complex and faster adaptive filter. The microphone signal MCCS thus compensated now still comprises signals produced by the sounds c and d. These sounds c and d together form the background sounds which are substantially the same for all the speaker units 12 because all the speaker units 12 are arranged inside the same conference space 10. Speaker detection in the selection signal generator 62 of the central unit 14 is now based on speech signals SP-1, SP-2, SP-3 whose level signals PS-1, PS-2, PS-3 are merely measures of the background sounds c and d. The speaker's voice should now be louder than this background level in order to be detected. This provides a satisfactorily performing speaker detection and also enables a comparatively simple echo canceller to be used.

The first coupling means 24 shown in FIG. 2 make it possible to change over from the compensated microphone signal MCCS to the direct microphone signal MC as soon as the status signal ST indicates the speech status. Since in the speech status the loudspeaker 18 does not receive a signal the effect of the echo canceller 20 is minimal and the adjustment of the echo canceller could be disturbed by the comparatively strong microphone signal MC from the speaker. In this case it is more advantageous to select the direct microphone signal MC instead of the compensated microphone signal MCCS.

The first coupling means 24 further enable the echo canceller 20 to be operated with signals whose frequency bandwidth is smaller than the bandwidth of the remainder of the conference system. The echo canceller 20 serves to improve speaker detection. It has been found that the bandwidth of the speech signal is mainly concentrated in a band from 0 to 3.5 kHz when the speaker is silent. Therefore, the use of an echo canceller having this bandwidth is adequate in order to achieve a correctly performing speaker detection. Thus, it is possible to have a conference system operating with high-quality wide-band signals having a bandwidth of, for example, 15 kHz and to have echo compensators operating with signals of a comparatively narrow bandwidth of, for example, 3.5 kHz. The sampling rate $f_s$ of said transversal filter can then be reduced by a factor of four to 8 kHz, which yields an even further reduction of the number of delay elements (N=180 to 256).

Figure 7:
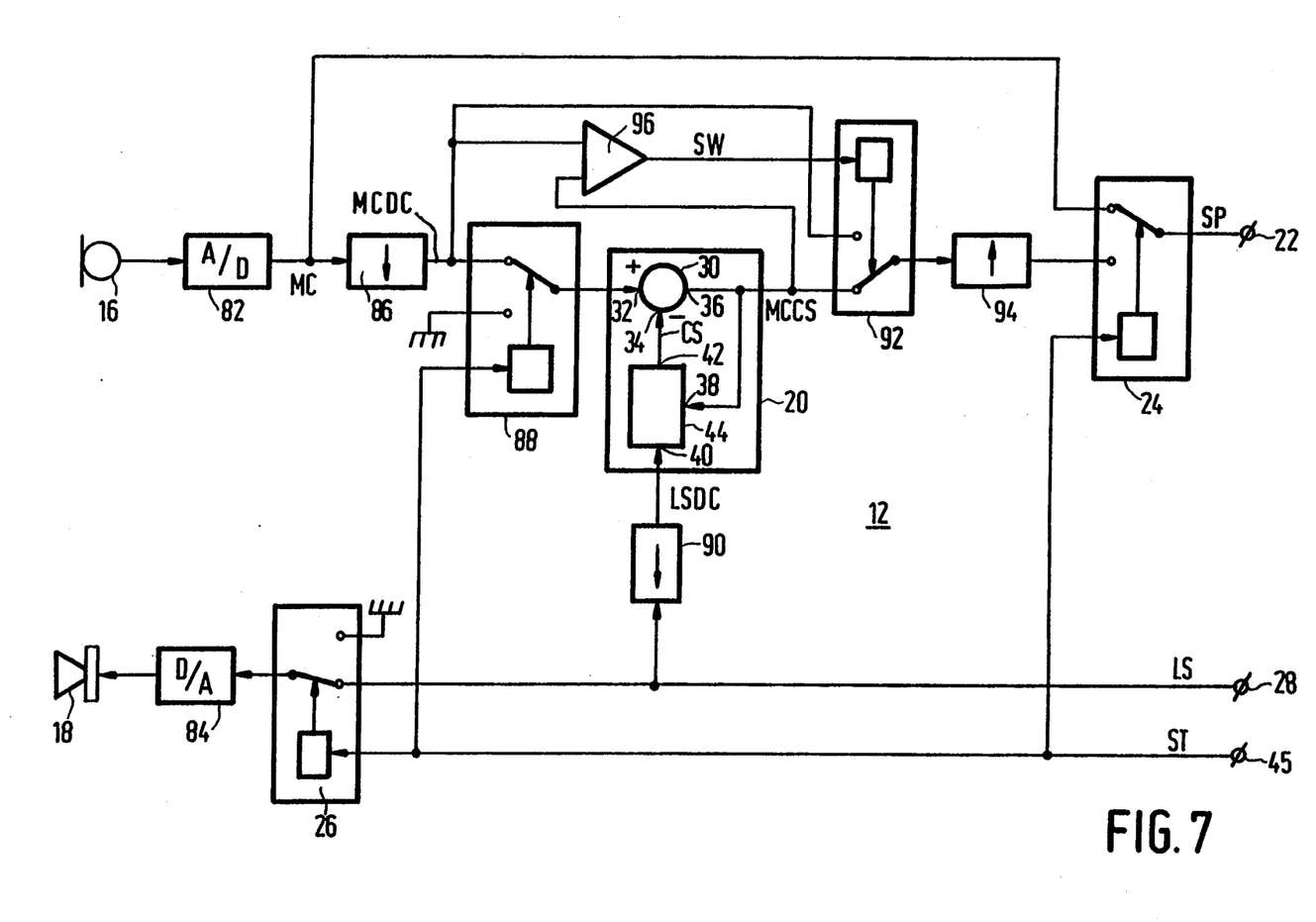
FIG. 7 is a block diagram showing an alternative speaker unit for use in a conference system in accordance with the invention.

FIG. 7 shows a speaker unit 12 with digital signal processing. The microphone signal MC is supplied by an analog-to-digital converter 82 operating, for example, with a first or system sampling rate $f_s$=32 kHz and with a 16-bit system signal-word length. The loudspeaker 18 is supplied with an analog signal by means of a digital-to-analog converter 84 having the same sampling rate and signal-word length. The central unit 14 is also constructed for digital signal processing in a manner not shown, but further operates in the same way as described with reference to FIG. 3. The sampling rate of the microphone signal MC is reduced by a factor of four by means of a first decimator 86 in order to obtain a second sampling rate of 8 kHz. The decimated microphone signal MCDC is applied to the first input 32 of the differential stage 30 of the echo canceller 20 via a circuit breaker 88, which echo canceller now operates at the second sampling rate of 8 kHz. The sampling rate of the common listening signal LS is also reduced by a factor of four by means of a second decimator 90, which supplies a decimated listening signal LSDC to the signal input 40 of the adaptive filter 38. The compensated microphone signal MCCS is applied to an interpolator 94 via second coupling means 92, which interpolator raises the second sampling rate of 8 kHz by a factor of four to the system sampling rate of 32 kHz. The decimation from 32 to 8 kHz is possible by a conversion in two steps. In the first step a decimation to 16 kHz is effected by means of a 6-point Finite Impulse Response (FIR) filter, followed by a decimation to 8 kHz by means of a 32-point FIR filter. The interpolator 94 can be a simple repeater which repeats the incoming samples. An accurate interpolation is not needed for automatic speaker detection. For the theory of decimators, interpolators and FIR filters reference is made to "Discrete-Time Signal Processing", A van der Enden & N. Verhoeckx, Prentice Hall. Under control of the status signal ST the circuit breaker 88 stops the signal supply to the echo canceller 20 when the status signal ST indicates the speech status. This prevents the adjustment of the adaptive filter 38 from being disturbed by the strong signal produced by the speaker. It may occur that the central unit 14 still assigns the listening status to the speaker unit 12 via the status signal ST while the speaker already speaks. This may be the case, for example, when the central unit can select a maximum number of speech signals at the same time. In this case the decimated microphone signal MCDC will yet reach the echo canceller 20. The echo canceller will attempt to cancel this signal to an optimum extent but it is not unlikely that the signal level of the compensated microphone signal MCCS exceeds that of the decimated microphone signal MCDC. In order to preclude erroneous speaker detection in the central unit 14 the second coupling means replace the compensated microphone signal MCCS by the decimated microphone signal MCDC until the level of the signal MCCS has decreased adequately. For this purpose the second coupling means 92 are controlled by a switching signal SW supplied by a comparator 96, in which the signal level of the decimated microphone signal MCDC is compared with the compensated microphone signal MCCS. The circuit breaker 88, the second coupling means 92 and the comparator 96 may also be used in the (analog) speaker unit shown in FIG. 2.

The adaptive filter may be a transversal filter as shown in FIG. 6. The algorithm performed in the control unit 80 then operates in accordance with the well-known Normalized Least Mean Square principle as known from the afore-mentioned book by Widrow & Steams. The principal formulas for this algorithm are:

$$CS_k = \overline{LS_k}^T \cdot \overline{w_k} \quad (1)$$
$$MCCS_k = MC_k - CS_k \quad (2)$$
$$\overline{w_{k+1}} = \overline{w_k} + 2\alpha \frac{\overline{LS_k} \cdot MCCS_k}{P_{LS}} \quad (3)$$
$$P_{LS} = \max(\overline{LS_k}^T \cdot \overline{LS_k}, P_{LSmin}) \quad (4)$$

Here $CS_k$ is the output of the transversal filter at the instant $t=k$, $MCCS_k$ is the compensated microphone signal at the instant $t=k$, $\overline{w_k}$ and $\overline{LS_k}$ are the N-dimensional column vectors (N=number of delay elements 74), which respectively represent the filter coefficients and the tap values at the instant $t=k$. The capital letter T in formula (1) represents the transpose of the column vector. $P_{LS}$ is the normalized power and a is the update factor, which has a value between 0 and 1. A practical value is approximately ⅛. The normalized power exhibits an additional minimum value. Thus, it is achieved that the control speed for weak input signals is reduced and the noise is less annoying.

We claim:

1. A conference system having: a plurality of speaker units to be arranged in one conference space, a central unit coupled to the speaker unit, at least one of the speaker units comprising:
    a microphone for generating a microphone signal (MC),
    a speech signal output for supplying a speech signal (SP) to the central unit in response to the microphone signal (MC),
    a listening signal input for receiving a common listening signal (LS) from the central unit, and
    a loudspeaker for the acoustic reproduction of the common listening signal (LS), wherein the improvement comprises the speaker unit further including an echo canceller which has:
    a differential stage having a first input for receiving the microphone signal (MC) and a second input for receiving a compensation signal (CS), and having an output coupled to the speech signal output to supply a compensated microphone signal (MCCS) in response to the difference between the microphone signal (MC) and the compensation signal (CS), and
    an adaptive filter having a signal input for receiving the common listening signal (LS), having a control input for receiving the compensated microphone signal (MCCS), and having a signal output for supplying the compensation signal (CS), the adaptive filter having an impulse response which is an estimate of the impulse response of a short echo path as a result of a direct acoustic coupling between the loudspeaker and the microphone of the relevant speaker unit and of an indirect acoustic coupling between the loudspeaker and the microphone of the relevant speaker unit via objects in the proximity of the speaker unit, in which estimate the impulse response of a long echo path as a result of an acoustic coupling between all the loudspeakers of all the speaker units and the microphone of the relevant speaker unit via the bounding surfaces of the conference space is ignored.

2. A conference system as claimed in claim 1, wherein the speaker unit further comprises:
    a status signal input for receiving from the central unit a status signal (ST) for signalling a speech status or a listening status to the speaker unit; and
    first coupling means for coupling the speech signal output to the microphone signal (MC) when the status signal (ST) indicates the speech status and to the compensated microphone signal (MCCS) when the status signal indicates the listening status.

3. A conference system as claimed in claim 2, wherein the echo canceller is adapted to process signals having a bandwidth smaller than the bandwidth of the microphone signal (MC) and the common listening signal (LS).

4. A conference system as claimed in claim 3, wherein the conference system is constructed to provide digital signal processing with a first sampling rate for the speech signal (SP) and the common listening signal (LS), the speaker unit comprising an analog-to-digital converter for converting an analog microphone signal into the microphone signal (MC) with the first sampling rate and a digital-to-analog converter for converting the common listening signal (LS) into an analog common listening signal, and the speaker unit further comprises:
    a first decimator for reducing the first sampling rate of the microphone signal (MC) to a second sampling rate which is a predetermined decimation factor lower than the first sampling rate, and for supplying a decimated microphone signal (MCDC) to the first input of the differential stage,
    a second decimator for reducing the first sampling rate of the common listening signal (LS) to the second sampling rate and for supplying a decimated common listening signal (LSDC) to the signal input of the adaptive filter;
    an interpolator for increasing the second sampling rate of the compensated microphone signal (MCCS) at the output of the differential stage and for supplying the compensated microphone signal with the first sampling rate.

5. A conference system as claimed in claim 4, characterized in that the interpolator is a repeater which repeats the incoming signal samples.

6. A conference system as claimed in claim 5, wherein the first sampling rate is substantially equal to 32 kHz, the decimation factor is equal to 4, and the adaptive filter is a transversal filter comprising 180 to 256 series-connected delay elements, whose output signals are added to form the compensation signal (CS) via weighting amplifiers having individually adjustable weighting gain factors, adaptation of the weighting gain factors being effected in accordance with the Normalized Least Mean Square algorithm.

7. A conference system as claimed in claim 6, wherein the speaker unit further comprises means for interrupting the signal supply to the first input of the differential stage when the status signal (ST) indicates the speech status.

8. A conference system as claimed in claim 7, wherein the speaker unit further comprises:
a comparator for comparing a power value of the microphone signal (MC) with a power value of the compensated microphone signal (MCCS) and for supplying a switching signal (SW) if the power value of the compensated microphone signal (MCCS) exceeds the power value of the microphone signal (MC),
second coupling means for replacing the compensated microphone signal (MCCS) by the microphone signal (MC) in response to the switching signal (SW).

9. A conference system as claimed in claim 8, wherein the central unit comprises:
means for receiving the speech signal (SP) from each of the speaker units,
selection means for selecting the speech signal (SP) of each of the speaker units in response to selection signals (SL) and for supplying selected speech signals (SPSL),
adding means for supplying the common listening signal (LS) in response to the sum of the selected speech signals (SPSL),
means for transmitting the common listening signal (LS) to each of the speaker units,
a status signal generator for generating the status signal (ST), for each of the speaker units in response to the selection signals (SL)
means for transmitting the status signal (ST) to each of the speaker units,
a selection signal generator for generating the selection signals (SL), which generator comprises:
a level signal generator for generating level signals (PS) in response to the speech signal (SP) of each of the speaker units, each of the level signals (PS) being a measure of the signal strength of the corresponding speech signal (SP),
comparison means for comparing the level signals (PS) with a reference signal (RF) and for supplying the selection signals (SL) in response to the fact that the reference signal (RF) is exceeded by the level signals (PS).

10. A conference system as claimed in claim 1, wherein the speaker unit further comprises means for interrupting the signal supply to the first input of the differential stage (30) when the status signal (ST) indicates the speech status.

11. A conference system as claimed in claim 1, wherein the central unit comprises:
means for receiving the speech signal SP from each of the speaker units,
selection means for selecting the speech signal SP from each of the speaker units in response to selection signals (SL) and for supplying selected speech signals (SPSL),
adding means for supplying the common listening signal (LS) in response to the sum of the selected speech signals (SPSL),
means for transmitting the common listening signal (LS) to each of the speaker units,
a status signal generator for generating the status signal (ST) for each of the speaker units in response to the selection signals (SL);
means for transmitting the status signal (ST) to each of the speaker units,
a selection signal generator for generating the selection signals (SL), which generator comprises:
a level signal generator for generating level signals (PS) in response to the speech signal (SP) of each of the speaker units, each of the level signals (PS) being a measure of the signal strength of the corresponding speech signal (SP),
comparison means for comparing the level signals (PS) with a reference signal (RF) and for supplying the selection signals (SL) in response to the fact that the reference signal (RF) is exceeded by the level signals (PS).

12. A conference system as claimed in claim 4, wherein the first sampling rate is substantially equal to 32 kHz, the decimation factor is equal to 4, and the adaptive filter is a transversal filter comprising 180 to 256 series-connected delay elements, whose output signals are added to form the compensation signal (CS) via weighting amplifiers having individually adjustable weighting gain factors, adaptation of the weighting gain factors being effected in accordance with the Normalized Least Mean Square algorithm.

13. A speaker unit for use in a conference system, which conference system comprises a plurality of speaker units to be arranged in one conference space, and a central unit to which the speaker units can be coupled, the speaker unit comprising:
a microphone for generating a microphone signal (MC),
a speech signal output for supplying a speech signal (SP) to the central unit in response to the microphone signal (MC),
a listening signal input for receiving a common listening signal (LS) from the central unit;
a loudspeaker for the acoustic reproduction of the common listening signal (LS), wherein the improvement comprises the speaker unit further including an echo canceller which has
a differential stage having a first input for receiving the microphone signal (MC) and a second input for receiving a compensation signal (CS), and having an output coupled to the speech signal output to supply a compensated microphone signal (MCCS) in response to the difference between the microphone signal (MC) and the compensation signal (CS), and
an adaptive filter having a signal input for receiving the common listening signal (LS), having a control input for receiving the compensated microphone signal (MCCS), and having a signal output for supplying the compensation signal (CS), the adaptive filter having an impulse response which is an estimate of the impulse response of a short echo path as a result of a direct acoustic coupling between the loudspeaker and the microphone of the relevant speaker unit and of an indirect acoustic coupling between the loudspeaker and the microphone of the relevant speaker unit via objects in the proximity of the speaker unit, in which estimate the impulse response of a long echo path as a result of an acoustic coupling between all the loudspeakers of all the speaker units and the microphone of the relevant speaker unit via the bounding surfaces of the conference space is ignored.

14. A speaker unit as claimed in claim 13, wherein the speaker unit further comprises:
   a status signal input for receiving from the central unit a status signal (ST) for signalling a speech status or a listening status to the speaker unit, and
   first coupling means for coupling the speech signal output to the microphone signal (MC) when the status signal (ST) indicates the speech status and to the compensated microphone signal (MCCS) when the status signal indicates the listening status.

15. A speaker unit as claimed in claim 14, wherein the echo canceller is adapted to process signals having a bandwidth smaller than the bandwidth of the microphone signal (MC) and the common listening signal (LS).

16. A speaker unit as claimed in claim 15, wherein the speaker unit is constructed to provide digital signal processing with a first sampling rate for the speech signal (SP) and the common listening signal (LS), the speaker unit comprising an analog-to-digital converter for convening an analog microphone signal into the microphone signal (MC) with a first sampling rate and a digital-to-analog converter for converting the common listening signal (LS) into an analog common listening signal, and the speaker unit further comprises:
   a first decimator for reducing the first sampling rate of the microphone signal (MC) to a second sampling rate which is a predetermined decimation factor lower than the first sampling rate, and for supplying a decimated microphone signal (MCDC) to the first input of the differential stage,
   a second decimator for reducing the first sampling rate of the common listening signal (LS) to the second sampling rate and for supplying a decimated common listening signal (LSDC) to the signal input of the adaptive filter,
   an interpolator for increasing the second sampling rate of the compensated microphone signal (MCCS) at the output of the differential stage and for supplying the compensated microphone signal with the first sampling rate.

17. A speaker unit as claimed in claim 16, wherein the interpolator is a repeater which repeats the incoming signal samples.

18. A speaker unit as claimed in claim 17, wherein the first sampling rate is substantially equal to 32 kHz, the decimation factor is equal to 4, and the adaptive filter is a transversal filter comprising 180 to 256 series-connected delay elements, whose output signals are added to form the compensation signal (CS) via weighting amplifiers having individually adjustable weighting gain factors, adaptation of the weighting gain factors being effected in accordance with the Normalized Least Mean Square algorithm.

19. A speaker unit as claimed in claim 18, wherein the speaker unit further comprises means for interrupting the signal supply to the first input of the differential stage when the status signal (ST) indicates the speech status.

20. A speaker unit as claimed in claim 19, wherein the speaker unit further comprises:
   a comparator for comparing a power value of the microphone signal (MC) with a power value of the compensated microphone signal (MCCS) and for supplying a switching signal (SW) if the power value of the compensated microphone signal (MCCS) exceeds the power value of the microphone signal (MC),
   second coupling means for replacing the compensated microphone signal (MCCS) by the microphone signal (MC) in response to the switching signal (SW).

21. A speaker unit as claimed in claim 13, wherein the speaker unit further comprises means for interrupting the signal supply to the first input of the differential stage when the status signal (ST) indicates the speech status.

22. A speaker unit as claimed in claim 16, wherein the first sampling rate is substantially equal to 32 kHz, the decimation factor is equal to 4, and the adaptive filter is a transversal filter comprising 180 to 256 series-connected delay elements, whose output signals are added to form the compensation signal (CS) via weighting amplifiers having individually adjustable weighting gain factors, adaptation of the weighting gain factors being effected in accordance with the Normalized Least Mean Square algorithm.

* * * * *